J. HORN.
RUBBER SET RIFFLE FOR ORE CONCENTRATORS AND THE LIKE.
APPLICATION FILED DEC. 4, 1917.

1,270,618.

Patented June 25, 1918.

INVENTOR
JOE HORN
BY Hazard & Miller
ATTORNEYS

UNITED STATES PATENT OFFICE.

JOE HORN, OF LOS ANGELES, CALIFORNIA.

RUBBER-SET RIFFLE FOR ORE-CONCENTRATORS AND THE LIKE.

1,270,618.  Specification of Letters Patent.  Patented June 25, 1918.

Application filed December 4, 1917. Serial No. 205,425.

*To all whom it may concern:*

Be it known that I, JOE HORN, a citizen of the United States, residing at Los Angeles, in the county of Los Angeles and State of California, have invented new and useful Improvements in Rubber-Set Riffles for Ore-Concentrators and the like, of which the following is a specification.

My invention relates primarily to shaking concentrating tables and consists in the novel features herein shown, described and claimed.

The principal object of my invention is to increase the working capacity of a given deck area.

Another object is to make a facing upon a deck which is not pierced by nails or the like, thereby keeping the deck comparatively dry.

Another object is to make a riffle and facing construction which may be readily repaired without rebuilding the entire construction.

Figure 1:
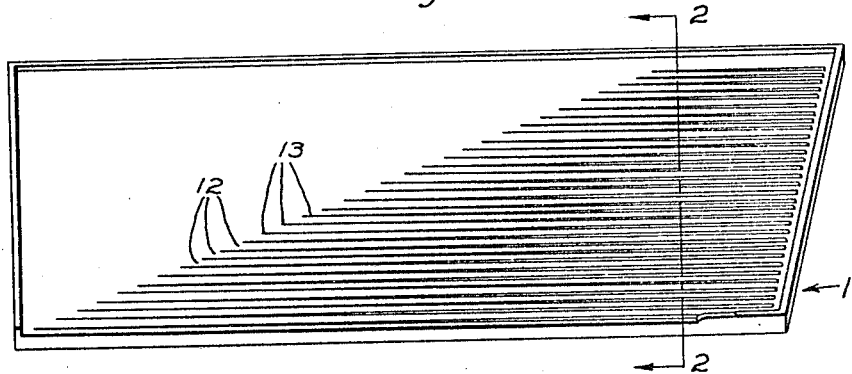
Figure 1 is a top plan view of a riffle board or riffle table embodying the principles of my invention.
Figure 2:
Fig. 2 is a cross section on the line 2—2 of Fig. 1.
Figure 3:
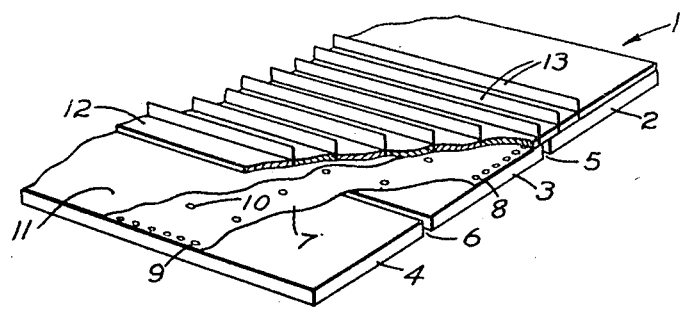
Fig. 3 is an enlarged fragmentary detail perspective.

The table 1 is a cross wash shaking table. The deck of the table is made up of boards 2, 3 and 4 of any suitable width and any desired number to produce the aggregate width of table, the boards being laid with spaces 5 and 6 between their meeting edges so that the boards may swell and shrink freely. After the deck has been built, a sheet of canvas 7 is securely tacked to the upper face of the boards 2, 3, 4, etc., there being rows of tacks 8 along the ends of the boards and similar rows of tacks 9 along the sides of the deck and intermediate tacks 10 scattered all over the deck to hold the canvas from flopping up and down on the deck. A heavy coat 11 of rubber glue is applied to the upper face of the canvas, the rubber glue serving to make the canvas water-proof, to cover the heads of the tacks, and to make a good anchorage for the facing. The facing consists of strips 12 of suitable linoleum cut to the proper width, with squared edges. These strips 12 are laid side by side longitudinally upon the rubber surface of the canvas and are pressed down firmly so that the glue will stick the strips to the canvas. Then the metal riffle plates 13 are driven down into the cracks between the sections 12. In this way a facing is produced having no nail holes or other defects to carry water from the surface of the facing through to the boards.

In an ordinary table having fifty wood riffles the capacity is fifty one-inch beds of pulp, and upon the same table I can place sixty-three rubber set riffles providing support for sixty-three one-inch beds of pulp, thereby increasing the capacity of the table twenty-five per cent. without increasing the area of the deck.

Figure 4:
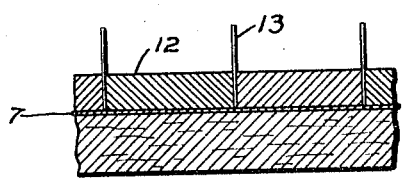
Fig. 4 is a cross sectional detail of my improved construction.

Another great advantage in the construction shown in Fig. 4 is that any damaged piece of the facing on the table may be removed and a new piece inserted without reconstructing the whole facing. In the old construction, when holes were formed through the linoleum and corresponding spots in the deck became rotten, it was almost impossible to repair the table and if the table was to be repaired it became necessary to tear off the entire linoleum facing and all the riffles and put on a new facing and new riffles, whereas in my construction, shown in Fig. 4, any piece of the facing may be removed or any piece of the riffle plate may be removed and a new piece of facing or a new piece of plate inserted without injuring the balance of the table.

Usually the strips 12 are cut an inch wide and the metal riffle plates 13 are cut to be five-eighths of an inch high at the end of the table and taper down to nothing, as shown in Fig. 1.

Various changes may be made in the details of construction without departing from the spirit of my invention as set up in the following claims.

I claim:

1. In a concentrating table or the like, a wooden deck, a sheet of fibrous material attached to the deck, a coat of adhesive material applied to the said sheet of fibrous material, strips of water-proof material applied to the adhesive material and riffle plates driven into the cracks between the strips of water-proof material.

2. In an ore concentrating table, a water-proof deck, strips of water-proof material stuck to the water-proof deck edge to edge, and riffles in the cracks between the strips of water-proof material.

3. A riffle construction comprising a suitable deck, strips of water-proof material glued to the deck, and riffles in the cracks between the strips of water-proof material.

4. As an article of manufacture, a cloth of fibrous material, a coat of adhesive material applied to the cloth, strips of water-proof material applied to the adhesive material and riffle plates driven into the cracks between the strips of water-proof material.

In testimony whereof I have signed my name to this specification.

JOE HORN.